March 24, 1959     J. W. VAN DENBURG     2,878,714
GLARE REDUCING DEVICE

Filed Oct. 30, 1956     2 Sheets-Sheet 1

INVENTOR
John W. Van Denburg
BY
Pennie Edmonds Morton Barrows Taylor
ATTORNEYS

March 24, 1959     J. W. VAN DENBURG     2,878,714
GLARE REDUCING DEVICE

Filed Oct. 30, 1956     2 Sheets-Sheet 2

INVENTOR
John W. Van Denburg
BY
Pennie Edmonds Morton Burrows Taylor
ATTORNEYS

United States Patent Office 2,878,714
Patented Mar. 24, 1959

2,878,714

GLARE REDUCING DEVICE

John W. Van Denburg, New York, N.Y.

Application October 30, 1956, Serial No. 619,212

6 Claims. (Cl. 88—1)

This invention relates to the reduction of glare from sources of light, such as the headlamps of approaching vehicles, and is concerned more particularly with a novel device, which may be placed before an observer and may be used by him to decrease the amount of light reaching his eyes. The device is so constructed that its effectiveness in cutting off light varies with the direction through it of the line of vision of the observer and, by slightly changing the position of his head, the observer may cause the device to transmit substantially all the light falling upon it or an amount decreasing to zero. While the device is useful for numerous purposes, it offers special advantages when installed in a motor car and a form of the device suitable for such application will, accordingly, be illustrated and described in detail for purposes of explanation.

The danger, to which those driving cars at night are exposed, and the discomfort, which they suffer, because of the glare from the headlamps of oncoming vehicles have long been recognized and many attempts have been made to avoid such effects. While improvements in equipment for the purpose of reducing glare, such as sealed beam lamps, hoods, etc., have been made, the effectiveness of such devices depends on proper maintenance and adjustment and can be quickly lost by a lack of attention. Moreover, each driver has control only over the equipment on his own car and is thus dependent for glare reduction on the equipment on other cars and the use of such equipment by their drivers. Other attempts to reduce the glare of headlamps of approaching cars have involved the use of spectacles of different colors or color combinations, windshields with colored areas, and colored screens placed before the driver, but such expedients are unsatisfactory because they impair the driver's vision over the entire field of view or else have the effect of darkening a part of the field.

The present invention is, accordingly, directed to the provision of a device, which may be mounted before the driver of a car and may be used by him to cut off any desired proportion of the light from oncoming cars. When the driver is in his normal position behind the wheel with the device in front of him, his line of vision through the device is such that the device transmits substantially all of the light falling upon it and thus does not impair his view. However, a slight change in the position of his head with a corresponding change in his line of vision through the device causes the device to cut off part of the light entering it, so that the glare is reduced, and the driver may vary the decrease in glare and, if he desires, cause all the oncoming light to be cut off.

The new device depends for its action on the application of the phenomena of partial transmission which involves the penetration of light from a medium of higher refractive index into a medium of lower refractive index at an angle of incidence greater than the critical, and the transmission of part of this light into a second medium of higher refractive index when brought sufficiently close, avoiding both total reflection and interference fringes in this area, and provides surfaces forming interfaces between such media. Oncoming light enters and passes through a medium of higher index and then passes through a surface into a medium of lower index. After passing through the medium of lower index, the light passes through a surface and then enters and passes through a medium of higher index. The angle of incidence of the light striking the surfaces between the media is close to the angle at which total reflection from the surfaces occurs. When the medium of lower index is in the form of a layer of proper thickness, the light transmitted through it varies with the angle of incidence of the light striking the surfaces from substantially full intensity to zero. Accordingly, an observer looking through the device toward a light source need change his line of vision through the device only slightly, in order to make the device effective to prevent as much as desired of the light from reaching him.

For a better understanding of the invention, reference may be made to the accompanying drawings, in which Fig. 1 is a diagrammatic view illustrating the device of the invention installed in a motor car in front of the driver;

Figure 3:
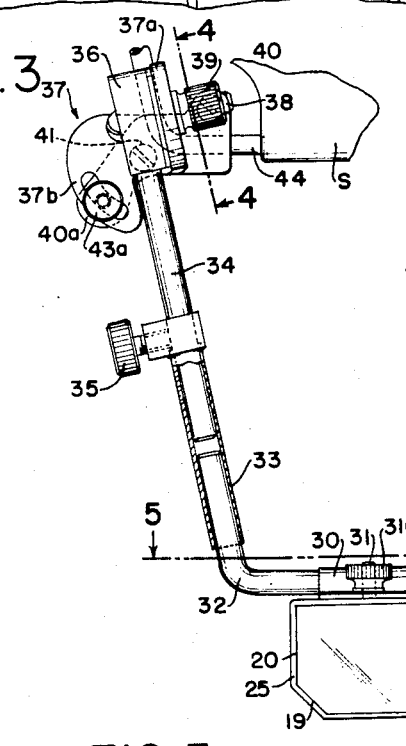
Fig. 3 is a view of the device and its mounting in front elevation.
Figure 4:
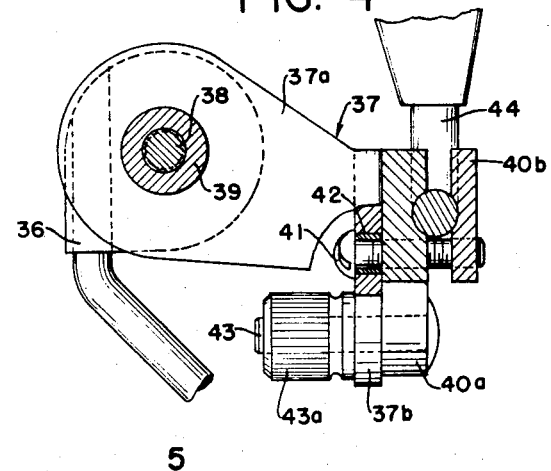
Fig. 4 is an enlarged sectional view on the line 4—4 of Fig. 3.
Figure 5:
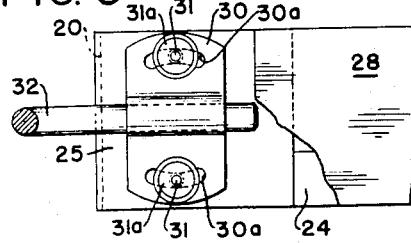
Figure 6:
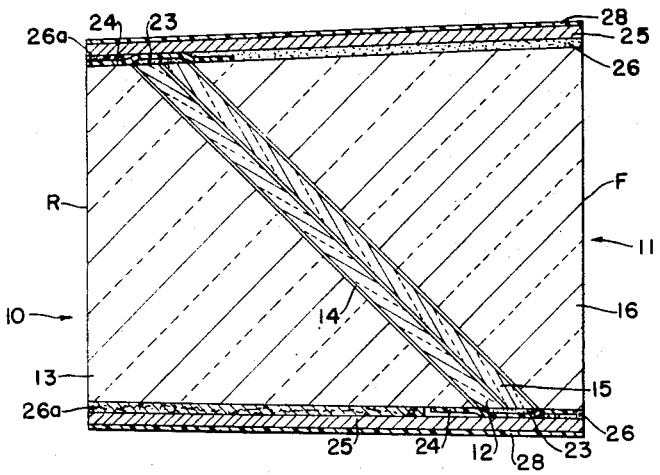
Figure 7:
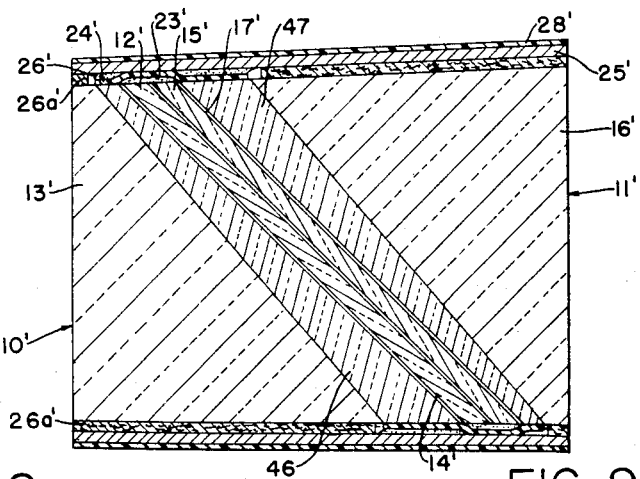
Figures 8, 9:
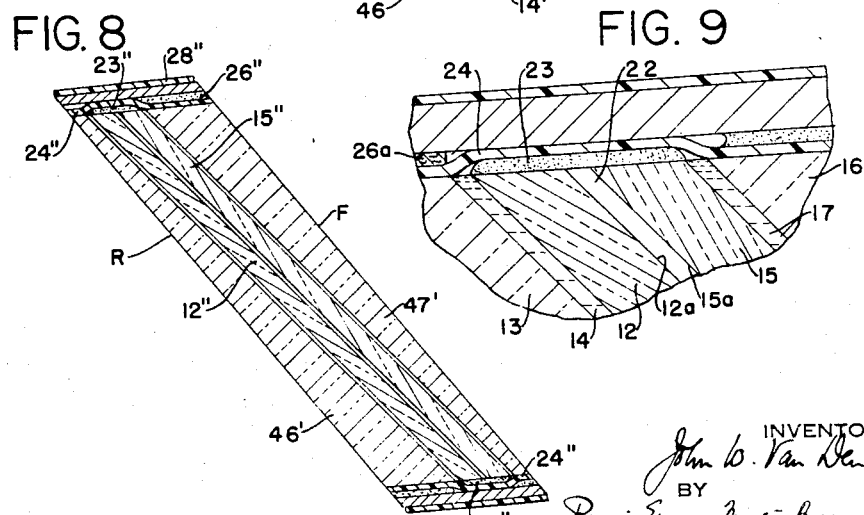

Figs. 5 and 6 are sectional views on the line 5—5 and 6—6, respectively, of Fig. 3;

Figs. 7 and 8 are sectional views similar to Fig. 6 of modified constructions; and Fig. 9 is a fragmentary view of a portion of Fig. 6 on an enlarged scale.

The new device in the form shown in Fig. 6 comprises an optical unit, which includes a pair of transparent components 10, 11 of substantially the same index of refraction. The component 10 is formed of an element 12, which has flat parallel polished faces and may be a piece of plate glass, and an element 13, which is a truncated prism and may be made of a suitable transparent plastic. The plate lies in contact with the sloping surface of the prism and, in order that the two elements may function as if they were in full contact, a quantity of a suitable liquid, such as oil, glycerine, etc., is introduced between them to form a film 14. While it would be possible to form the component 10 of a single piece of glass or plastic of the proper shape, it would be expensive to make the component entirely of glass and it would be difficult to make the sloping surface of the component sufficiently flat, if it were made of a plastic material. Accordingly, the combination of a glass plate and a prism of plastic is preferred, although other combinations of elements and materials may be employed, if desired.

The component 11 is similar to the component 10 and comprises a plate 15 of glass and a truncated prism 16 of plastic material with a film 17 of glycerine, etc., between them, the position of the prisms in relation to the plates being reversed in the two components. The top and bottom surfaces of component 10 diverge toward the right as illustrated in Fig. 6, that is, in a direction away from an observer along his line of sight, and the top and bottom surfaces of component 11 similarly diverge. One lower corner of the components is cut away to form a long sloping surface 18, beneath which the driver may obtain a good view of the roadway lying directly ahead of the car, and the opposite corner is similarly cut off to provide a short sloping surface 19, so that the device can be better folded out of the way against the car roof. The wide end surface 20 adjacent the surface 19 is straight and lies at approximately right angles to the long axis of the unit while the narrow end surface 21 diverges from the surface 20 in a direction away from the observer, as illustrated in Fig. 5.

The opposed faces of the components 10 and 11 are parallel within a tolerance of about 0.00003" and are separated by an element of lower index of refraction than the components and such an element may be provided by securing the components together with portions of the sloping opposed surfaces of their elements 12 and 15 spaced a distance of approximately 0.00001" to 0.00004". The space between the opposed surfaces of the plates contains air and thus forms the transparent optical element 22 lying between and in contact with the components and of a substantially lower index of refraction than that of the components. Since the indices of refraction of the components 10 and 11 are substantially the same, a ray of light entering one component will, upon striking the first of the opposed surfaces at an angle greater than the critical angle of said surface, split into a transmitted beam and a reflected beam and the transmitted beam will pass through the transparent element 22 and the other component and emerge from the other component at substantially the same angle at which it entered the first component.

To secure the glass elements 12, 15 together with the air element between them, a layer 23 of hard cement is applied to all four edges of the plates, while they are held at the desired spacing, and the layer spans and closes the edges of the space. The plates 12, 15 may then be connected to their respective prisms 13, 16 by a strip 24 of impervious resilient material, such as sheet rubber, which is applied to the edges of the prisms so as to overlie the layer 23 of hard cement and also to overlie and seal the edges of the spaces containing the liquid films 14, 17. Because of its resiliency, the strip permits slight relative movement of the prisms.

In a form of the device suitable for installation in a motor car, the optical unit or block made up of the components 10, 11 with the air element 22 between is supported in a mounting, which is so constructed that the block may be placed in proper position in the line of vision of the observer, may be adjusted as required, and may be moved out of place when not needed. A suitable mounting for the purpose comprises a sheet metal clamp 25 of U-shape, which fits closely about the end of the block having the short inclined surface 19. The clamp is secured in place by a layer of cement 26, which is disposed between the inner surface of the clamp and only one of the components, such as prism 16, and, if desired, soft packing material 26a can be inserted between the clamp and the other component. In the construction shown in Fig. 6, the layer of cement 26 lies between the clamp 25 and the top and bottom surfaces of prism 16 with the cement overlying that part of tape 24, which is secured to the surfaces of prism 16. With this arrangement, the prism 13 is not tightly held in place and differential expansion of the components will not impair the action of the device. The narrow end of the block is similarly enclosed by a metal clamp 27, which is secured by a layer of cement to the same component as that to which clamp 25 is attached with soft packing material between the clamp 27 and the other component. A sheet of rubber or like impervious material 28 is then applied to the top and bottom surfaces of the block with the sheet overlapping the inner ends of clamp 25 and overlying clamp 27. Preferably, all exposed surfaces of the block, except the front and rear surfaces F and R, are given a black coating to reduce stray reflections from the surfaces, before the parts, such as clamps 25, 27 and the sheet 28, are placed in position.

A metal clip 30 is attached to clamp 25 by screws 31 secured to the top surface of the clamp and knurled nuts 31a threaded on the screws. The screws pass through curved slots 30a in the clip, so that the latter can be adjusted angularly with reference to the clamp and block. The clip is formed to overlie one end of a bent rod 32 and secures the rod to the block. The other end of the rod carries a sleeve 33 fast thereon and the sleeve receives one end of a second rod 34 and has a screw 35, by which the sleeve may be clamped to rod 34 in different angular and extended positions. The other end of rod 34 is secured in an opening in a disc 36, which is held against the face of one leg 37a of an L-shaped bracket 37 by a screw 38 projecting through an opening in the disc and bracket. A knurled nut 39 on the screw holds the disc and bracket together and makes it possible to vary the angular position of the disc relative to the bracket. The other leg 37b of the bracket lies against the face of one member 40a of a clamp and is pivotally secured thereto by a screw 41, which passes through a sleeve 42 in an opening through the bracket leg 37b. The leg 37b has a curved slot and a screw 43, which passes through the slot and into the clamp member 40a, carries a nut 43a, which can be tightened to hold the bracket in different angular positions in relation to the clamp member. The clamp made up of member 40a and its associated part 40b is secured to the rod 44, on which the sun shade S of the car is mounted, the rod having one end movably mounted in a fitting 45 secured to the inside of the car structure above and to the left of the driver.

In producing the optical unit or block of the device in the form shown in Fig. 6, a pair of pieces of plate glass are cut to the desired shape and then placed in contact. Even though the pieces are of good quality, their opposed surfaces do not have a substantially uniform spacing over their entire areas and, when held in the proper position, interference rings will be observable. If these rings are concentric about the central areas of the plates, the plates may be regarded as having areas, which are fairly uniformly spaced. Pressure may be applied to the peripheries or ends of the plates to modify the interference pattern and the most desirable condition of the plates, measurements for which are given above, is one in which the spacing as indicated by these interference fringes is such that the area included between the brown-blue fringe and the first red-green fringe is as large as possible, when viewing reflected light at an angle of incidence of about 40°. With the plates held under pressure producing the effects stated, the layer 23 of hard cement is applied to their edges and the pressure is maintained until the cement has set. Thereafter, the prisms are placed against the outer faces of the plates, the strip of resilient material 24 is applied, and the glycerine or like liquid is introduced between the opposed faces of the plates and their respective prisms through an opening in the strip, which is later sealed. The block is then completed by the application of the clamps 25, 27 and of the enclosing sheet 28.

When the device is in position before a driver seated at the wheel of a car, it may readily be adjusted to a position where he sees the entire roadway beneath the bottom of the block, and the light from that part of the field of view in front of the car comes through the block substantially undiminished, thus giving a clear view, since, when the device is in proper position, light entering the front surface F travels through the block and reaches the driver without substantial decrease in intensity. In its travel through the block, the light passes at the inner surface 15a of the plate 15 from a medium of relatively high index of refraction into a medium of relatively low index of refraction and then back at surface 12a into a medium of higher index. By a slight movement of his head, the driver may change his line of vision through the block so that light from oncoming vehicles can reach his eyes only through the device and so that the angle of incidence of the oncoming light on the surface 15a is slightly greater than the angle of total reflection. At the same time, he can look past the device beneath the surface 18 and see his own side of the road. As the line of vision changes, the amount of light passed through the air element 22 decreases due to the phenomenon of partial transmission in areas of total reflection, as the angle of incidence of the oncoming light somewhat exceeds the angle of total reflection, the amount of light transmitted decreasing as the angle of incidence exceeds the critical angle. As the driver moves his head back to its initial position, the amount of light passing through the block increases until the driver's head reaches a position, at which the block causes substantially no reduction in the amount of light reaching him.

The mounting constructed as described permits the various adjustments necessary to place the block in the desired position. Also, it is possible with the mounting to swing the arm formed of rods 32, 34, so that the block lies close to the top of the vehicle and wholly out of the field of vision of the driver as indicated in dotted lines in Fig. 2.

In the construction shown in Fig. 6, the effect of rapid changes in temperature, which might cause temporary stresses and deformations affecting the performance of the device, is avoided by mounting one component tightly in the clamp by means of cement, while the other component is held loosely and is free to expand or contract. Another way of avoiding the detrimental effect of temperature changes is shown in Fig. 7, in which the component 10' is formed of a glass plate 12', a prism 13', and a wedge 46, which lies between the prism and the plate. The wedge 46 lies in close contact with prism 13' and a layer 14' of balsam or like liquid lies between the wedge and the plate 12'. The component 11' similarly consists of a glass plate 15', a prism 16', and a wedge 47 in contact with the face of the prism and spaced from the space of the glass plate by a film 17' of suitable liquid.

In forming the block as shown in Fig. 7, the glass plates of the two components are placed in contact, subjected to pressure, if necessary, to provide the desired relatively uniform spacing between them, and then secured together by a layer 23' of hard cement. The wedges 46, 47 are then placed against the outer faces of the glass plates, the films of liquid are introduced between the opposed surfaces of the wedges and plates, and tape 24' is applied to the edges of the wedges and to the outer surface of layer 23' of cement to seal the liquid films. The assembly of plates and wedges is then mounted in a clamp 25' with a layer 26' of cement between the clamp and the tape 24'. A second clamp similar to clamp 27 is then applied and secured in place by cement between the clamp and the tape 24', after which soft packing material 26a' is placed between the clamps and the prisms and a strip of sheet material 28' is applied in the same manner as the sheet 28. When the block shown in Fig. 7 is subjected to temperature changes, the prisms 13', 16' are free to have a slight movement relative to the wedges and plates and the plates and wedges are substantially insulated by the prisms, so as not to be greatly affected by temperature changes.

In the construction shown in Fig. 7, the outer surfaces of the wedges lie at an angle, such as one of 5°, to be opposed inner surfaces of the glass plates and there are thin air spaces between the outer surfaces of the wedges and the prisms 13', 16'. The thickness of these air spaces is not critical and they pass light at all positions of use of the block, since the angle of incidence of light on the surfaces defining the air spaces is always substantially less than the angle of total reflection.

In the construction illustrated in Fig. 8, the optical unit comprises a pair of glass plates 12", 15", which are similar to plates 12, 15 and are secured together in the desired relation by a layer of hard cement 23" applied to their edges. The plates lie between wedges 46', 47', which are similar to the wedges 46, 47, and films of balsam or like liquid lie between the outer faces of the plates and the inner faces of the wedges. The assembly of wedges and plates is secured together by a strip of tape 24" similar to the tape 24 after blackening the edges of the unit. The unit is then mounted in clamps similar to clamps 25, 27 with a layer of cement 26" interposed between the tape 24" and the clamps. A sheet 28" is then applied to the unit in the same manner as is shown in Fig. 3. As the wedges are relatively thin, they are not subject to distortion as a result of temperature changes.

Figure 1:
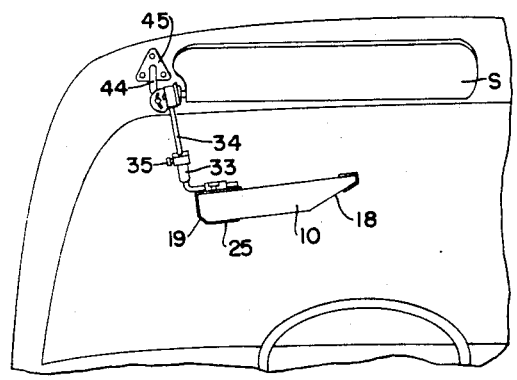
Figure 2:
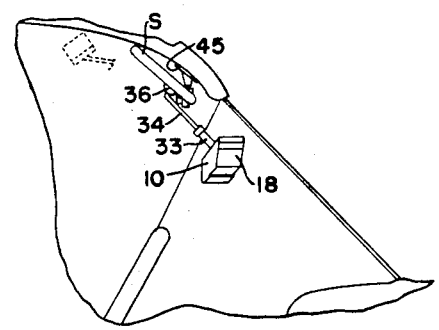
Fig. 2 is a view similar to Fig. 1, but showing the installed device from the right side of the car.

In the use of the unit of Fig. 8, it is necessary to mount it with its front and rear surfaces F, R inclined to the oncoming light in order that the deviated beam issuing from the device will reach the eyes of the observer. Because of the necessary inclined mounting of the unit, its top surface marks part of the field of vision. The effect of the masking can be largely avoided by placing the device in an inclined position with its right end a little higher than its left, as indicated in Figs. 1 and 2, so that all parts of the field are visible to at least one eye at all times. The unit of Fig. 8 is lighter in weight and somewhat less expensive to produce than those shown in Figs. 6 and 7 and may be preferred for those reasons.

In the constructions shown in Figs. 7 and 8, wedges may be substituted for assemblies 12', 46 and 15', 47 and for 12", 46' and 15", 47 and glass or a relatively elastic type of plastic or similar material may be used for such wedges, so that their tendency to distort is small.

I claim:

1. A glare reducing device for varying light transmission, which comprises an optical unit including a pair of transparent components having opposed spaced surfaces parallel within a tolerance of not more than about 0.00003 inch, each component being of generally wedge shape, a transparent element forming a layer between and in contact with said opposed surfaces, the element having an index of refraction substantially lower than that of the components and a thickness such as to be optically equivalent to a layer of air of a thickness ranging from about 0.00001 to 0.00004 inch, the indices of refraction of said components being so correlated and the components so arranged that a ray of light entering one component will, upon striking the first of said opposed surfaces at an angle greater than the critical angle of said surface, be split into a transmitted beam and a reflected beam and the transmitted beam and a reflected beam and the transmitted beam will pass through said transparent element and said other component and emerge from said other component at substantially the same angle at which it entered the first component, and means securing said components together with said opposed surfaces in contact with said element, whereby the amount of light transmitted through said device to an observer will vary as the angle of incidence of the oncoming light striking the first of said opposed surfaces changes and will decrease as the said angle of incidence exceeds the critical angle.

2. The device of claim 1, in which the components have substantially the same indices of refraction.

3. The device of claim 1, in which each component also includes an element in the form of a transparent plate having substantially flat parallel surfaces, one flat surface of each plate being in contact with its associated prism and the other flat faces of the plate bounding the element of low index of refraction.

4. The device of claim 3, in which each plate is relatively yieldingly secured to its adjacent prism.

5. The device of claim 3, which includes supporting means comprising a clamp enclosing one end of the completed assembly and gripping parts of the components tightly at top and bottom and permitting slight relative motion of the other parts.

6. The device of claim 5, in which the parts of the unit tightly gripped by the clamp include both plates.

References Cited in the file of this patent

UNITED STATES PATENTS

| | | |
|---|---|---|
| 1,719,154 | Wetherbee et al. | July 2, 1929 |
| 2,287,546 | Binda | June 23, 1942 |
| 2,345,777 | Somers | Apr. 4, 1944 |
| 2,392,978 | Dimmick | Jan. 15, 1946 |
| 2,722,862 | Schwede | Nov. 8, 1955 |

FOREIGN PATENTS

| 429,340 | Great Britain | May 25, 1935 |
|---|---|---|